(12) United States Patent
Davoren et al.

(10) Patent No.: US 6,425,391 B1
(45) Date of Patent: Jul. 30, 2002

(54) ELECTROMAGNETIC RADIATION COLLECTOR SYSTEM

(76) Inventors: Jeffrey A. Davoren, 12981 Mt. Zion Rd., Pine Grove, CA (US) 95665; Erik E. Lono, P.O. Box 1536, Hayfork, CA (US) 96041

( * ) Notice: Subject to any disclaimer, the term of this patent is extended or adjusted under 35 U.S.C. 154(b) by 0 days.

(21) Appl. No.: 09/865,979

(22) Filed: May 23, 2001

(51) Int. Cl.$^7$ .................................................. F24J 2/10
(52) U.S. Cl. ........................ 126/683; 126/685; 126/690
(58) Field of Search ................................ 126/685, 683, 126/686, 687, 688–691, 600; 359/592, 593

(56) References Cited

U.S. PATENT DOCUMENTS

| | | | | |
|---|---|---|---|---|
| 4,201,197 A | * | 5/1980 | Dismer | 126/685 |
| 4,257,401 A | * | 3/1981 | Daniels | 126/685 |
| 4,282,858 A | * | 8/1981 | Bowers, Jr. | 126/685 |
| 4,411,490 A | * | 10/1983 | Daniel | 126/685 |
| 4,841,946 A | | 6/1989 | Marks | |
| 4,943,125 A | | 7/1990 | Laundre' et al. | |
| 5,540,216 A | | 7/1996 | Rasmusson | |
| 5,575,860 A | | 11/1996 | Cherney | |
| 5,581,447 A | | 12/1996 | Raasakka | |
| 5,877,874 A | | 3/1999 | Rosenberg | |

FOREIGN PATENT DOCUMENTS

JP        5-181042     *  7/1993     ................. 126/685

* cited by examiner

*Primary Examiner*—James C. Yeung
(74) *Attorney, Agent, or Firm*—Theodore J. Bielen, Jr.

(57) ABSTRACT

A collection device for capturing and transmitting electromagnetic radiation utilizing a reflector having a concave reflecting surface for concentrating electromagnetic radiation to a focal point. The reflector also includes an opposite surface, a flexible optical guide includes a first end portion which is located at the focal place of the reflector. Flexible optical guide also includes an intermediate portion which extends to the reflector and a second end portion which is located at the opposite surface of the reflector. The flexible optical guide extends through the reflector such that distribution of the concentrated electromagnetic radiation will pass from the second end portion of the fiber optic cable.

11 Claims, 3 Drawing Sheets

ELECTROMAGNETIC RADIATION COLLECTOR SYSTEM

BACKGROUND OF THE INVENTION

The present invention relates to a novel and useful solar collector system.

Solar energy has served as a means for generating electricity and heat at an accelerated pace. Although solar energy comprises a very abundant source, conversion to useable forms of energy is expensive.

In the past, many systems have been devised to capture solar radiation. For example, solar panels have been employed in fixed arrays to directly convert solar radiation to electricity. In addition, circulation membranes have been employed to heat water for use within buildings and for use in swimming pools and spas. Other systems employ concave reflectors that concentrate solar radiation substantially at a point, where it is then employed to heat materials or is transferred as light to secondary conversion apparatuses.

For example, U.S. Pat. Nos. 4,841,946 and 5,540,216 show concave solar power collectors which track movement of the sun and convert the solar radiation into heat.

U.S. Pat. No. 5,877,874 shows a holographic planar concentrator which collects optical radiation from the sun for conversion through photovoltaic cells in to electrical energy. Also, fiber optic light guides transfer collected light to an interior of a building for illumination or for the purpose of producing hot water.

U.S. Pat. No. 5,581,447 shows solar skylight apparatus in which light is collected from the sun and transmitted to the inside of a building through a fiber optic cable. The light is then dispersed within a room to provide illumination.

U.S. Pat. Nos. 4,943,125 and 5,575,860 show solar collectors that employ fiber optic fibers for use as energy sources.

A solar collection device which is efficient and simple in construction would be a notable advance in the field of solar energy production.

BRIEF SUMMARY OF THE INVENTION

In accordance with the present invention a novel and useful collection device for capturing and transmitting electromagnetic radiation received from sun is herein provided.

The device of the present invention utilizes a reflector having a concave reflecting surface. The reflector can be of any suitable design such as parabolic reflector, known in the art. In such reflectors, essentially parallel rays of solar radiation are concentrated to a point, thus, intensifying the radiation captured. The reflector may be mounted on a tracking device which is also known in the art and to permit the reflecting surface to track the movement of the sun across the sky during daylight hours.

The present invention also includes a flexible optical guide having a first end portion, a second end portion, and an intermediate portion therebetween. The flexible optical device may take the form of a fiber optic conduit, a fiber optic cable or the like. The first end portion of the optical guide is placed at the focal point or focal place of the reflecting surface to receive the reflected electromagnetic radiation which is concentrated thereat. The intermediate portion of the flexible optical guide extends from the first end portion, through the reflector, and terminates in the second end portion on the opposite side of the reflector from the reflector's radiation concentrating surface.

The first end portion may further include an end surface which faces the reflecting surface of the reflector. Such end surface may be concave to more easily collect concentrated electromagnetic radiation at the focal place of the reflector. It should be noted that the first end portion be formed into a loop which connects to the intermediate portion of the flexible optical guide, which itself terminates in the second end portion behind the reflector. Of course, the flexible optical guide may be constructed as a contiguous member or in segments.

Light passing through the flexible optical guide may be used to produce heat, electricity, or pass through a heat exchanger to heat or energize liquid media.

It may be apparent that a novel and useful collection device for capturing and transmitting electromagnetic radiation has been hereinabove described.

It is therefore an object of the present invention to provide a collection device for capturing and transmitting electromagnetic radiation which is simple to manufacture and operate.

Another object of the present invention is to provide a collection device for capturing and transmitting electromagnetic radiation which utilizes a flexible optical guide and is very efficient in capturing electromagnetic radiation from the sun.

Another object of the present invention is to provide a collection device for capturing an transmitting electromagnetic radiation which is easily sized to produce energy in varying capacities.

A further object of the present invention is to provide a collection device for capturing and transmitting electromagnetic radiation which is suitable for congested or urban areas.

The invention possesses other objects and advantages especially as concerns particular characteristics and features thereof which will become apparent as the specification continues.

Figure 1:
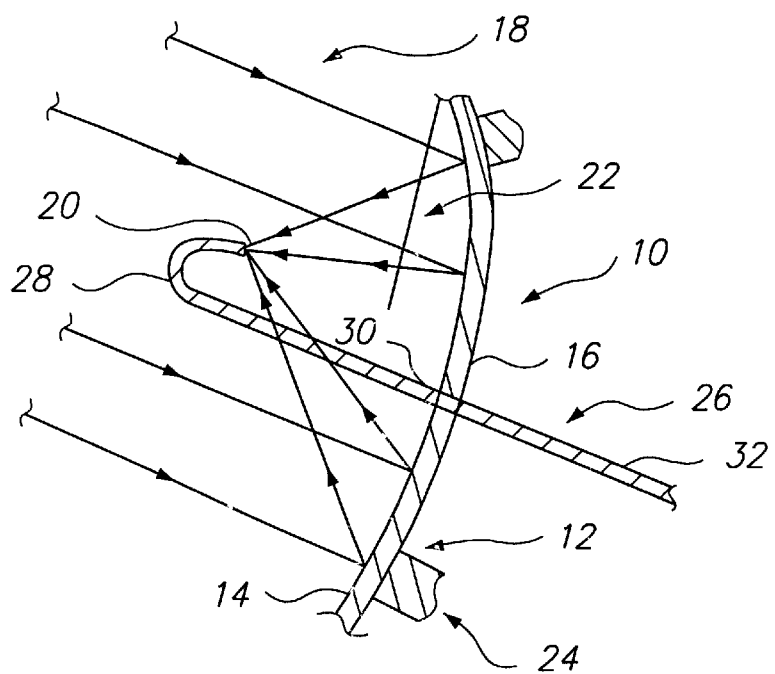
FIG. 1 is a sectional view showing the relationship between the flexible optical guide and the reflector used in the present invention.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the hereinabove delineated drawings.

The invention as a whole is shown in the drawings by reference character 10, and any upper case letter to represent various embodiments thereof. With respect to FIGS. 1 and 2, device 10 includes as one of its elements a reflector 12 which may be concave in figuration. Specifically, reflector 12 may take the form of a parabolic mirror having a reflecting surface 14 and an opposite surface 16 which is generally non-reflective. In essence, reflecting surface 14 captures or gathers plurality of parallel rays 18 from the sun and focuses the same to a focal place 20. Focal place 20 may externalize in a point or a small area. Reflected rays 22 indicate such concentration of electromagnetic radiation to focal place 20. Support 24, FIGS. 1 and 4, may be of a conventional configuration to permit reflector 12 to track the sun as it travels across the sky on a daily basis. Since such supports are known in the art, support 24 is only partially shown in the drawings.

Figure 2:
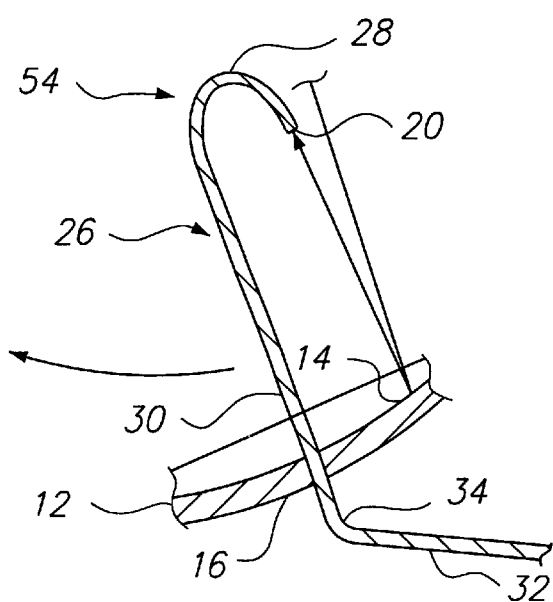
FIG. 2 is a sectional view showing the bending of the flexible optical guide during movement of the reflector for tracking solar radiation.

Device 10 also includes as one of its elements, a flexible optical guide 26 which takes the form of a fiber optic conduit such as a glass, crystalline, or hollow wave guide. In any case, such fiber optic conduits are known in the art and are capable of transmitting electromagnetic radiation from focal place 20 and through optical guide 26. As depicted in FIGS. 1 and 2, optical guide 26 includes a first end portion 28 positioned at focal place 20. Intermediate portion 30 connects to first portion 28 and extends to second portion 32 which lies on the same side of reflector 12 as back surface 16. It may be observed from FIGS. 1 and 2 that intermediate portion 30 extends through reflector 12 and links first portion 28 to second portion 32. Thus, electromagnetic radiation gathered at focal place 20 is conducted or permitted to flow from first portion 28, through intermediate portion 30, and to second portion 32. Looking at FIG. 2, it may be observed that as reflector 12 tracks the sun, optical guide 26 is capable of flexing or bending. It may also be seen that such bending may take place at the conflux of intermediate portion 30 and second portion 32, denoted by reference character 34. Of course intermediate portion 30 and first portion 28 of optical guide 26 would be formed in a rigid manner relative to bend portion 34 in order to maintain focal place 20 of reflector 12 at first portion 28 of optical guide 26.

Figure 3A:
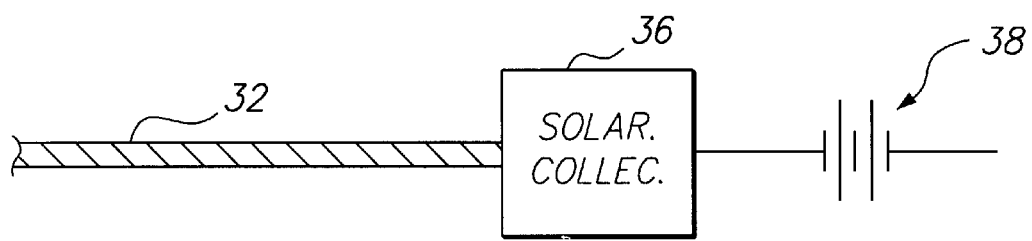
FIG. 3A is a schematic view representing transduction of solar energy into electricity.
Figure 3B:
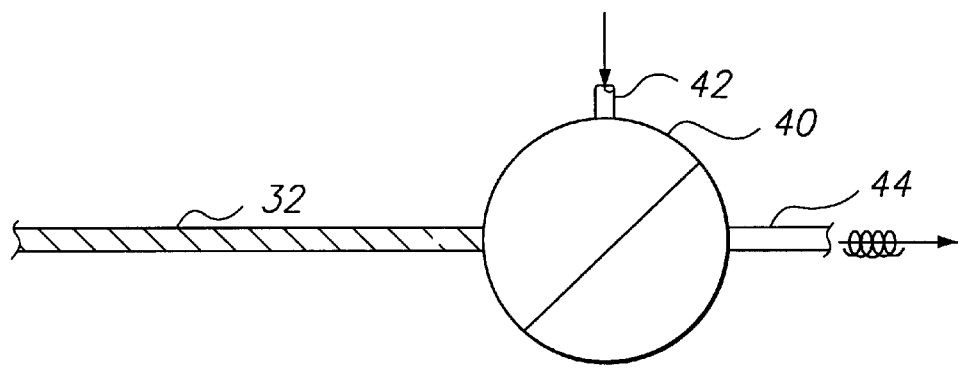
FIG. 3B is a schematic view representing solar energy into a heat exchanger for liquids.
Figure 3C:
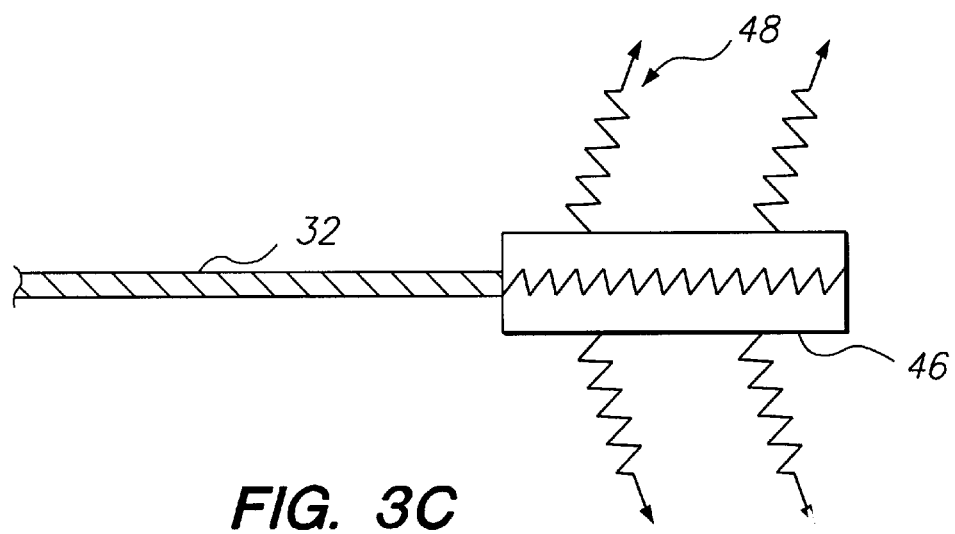
FIG. 3C is a schematic view representing direct heating of a radiator through solar energy.

With reference to FIGS. 3A, 3B, and 3C, it may be observed, that device 10 may use to generate energy of different types. For example, FIG. 3A directs electromagnetic radiation through second portion 32 of optical guide 26 to a solar collector 36 which transforms the same into electrical energy denoted by electrical potential 38. Likewise, electromagnetic radiation may be passed to heat exchanger 40, FIG. 3B, to heat fluids passing through inlet conduit 42 and egressing at exit conduit 44. In addition, FIG. 3C depicts electromagnetic radiation passing to a radiator 46 which directly generates heat depicted by plurality of heat rays 48.

Figure 4:
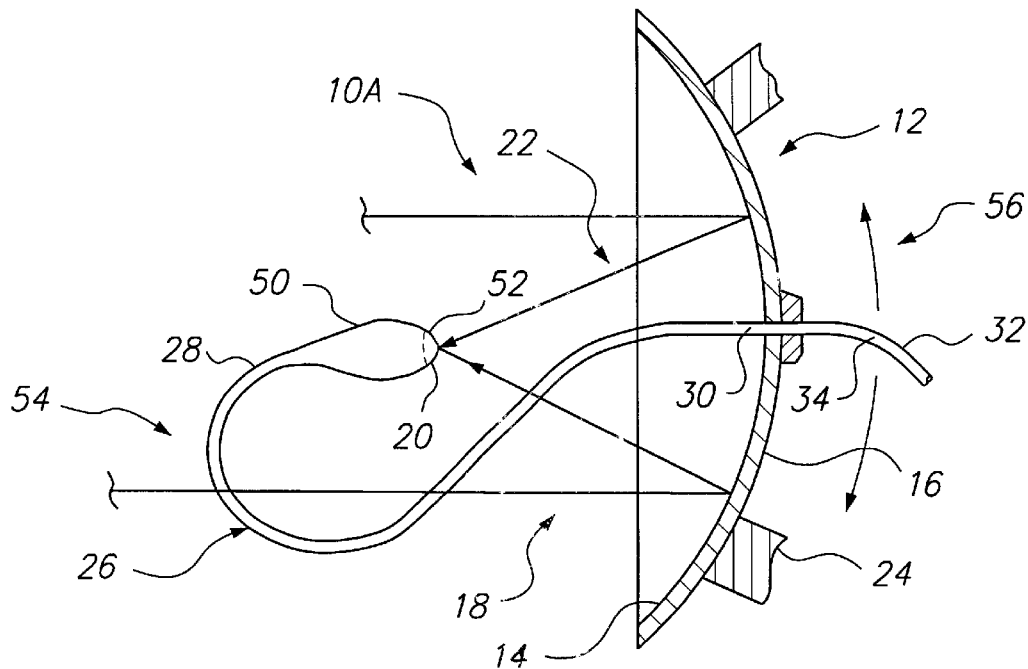
FIG. 4 is a sectional view showing another embodiment of the device of the present invention.
Figure 5:
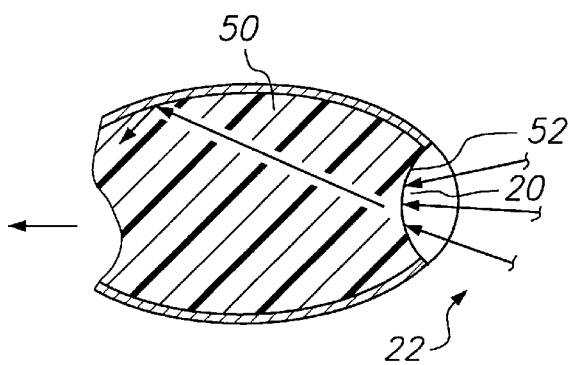
FIG. 5 is a partial sectional view of the end portion of the flexible optical guide depicted in FIG. 4.
Figure 6:
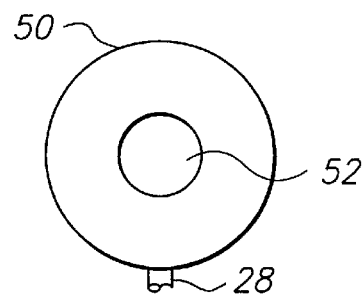
FIG. 6 is a front elevational view of the end portion of the flexible optical guide depicted in FIG. 4.

Turning to FIG. 4, it should be noted that another embodiment 10A is shown having a first portion 28 including large end 50 having end surface 52. End surface 52 is concave and lies at the terminus of first end portion 28 which is in the form of a loop 54. Turning to FIGS. 5 and 6, it may be apparent that converging rays 22 are internally reflected within end 50 and pass along optical guide 26 to second end portion 32 for use. End portion 50 may be a crystalline, glass, or a hollow wave-guide, as described hereinabove. In any case, concave surface 52 adds to the efficiency of the gathering of converging reflected rays 22 from reflector 12 at focal place 20. Moreover, the embodiment shown in FIGS. 4–6 would again include a relatively rigid first portion 28 of optical guide 26 and bending area 34 behind reflector 12 opposite back surface 16 thereof. Thus, embodiment 10A of FIGS. 4–6 is also capable of tracking the sun according to directional arrows 56.

In operation, the user orients reflector 12 to gather the parallel rays 18 emanating from the sun. Converging rays 22 are directed to the end surface 52 of first portion 28 of optical guide 26. End surface 52 is positioned at focal place 20 of reflector 12 such that converging rays 22 pass into optical guide 26 and are conducted through first portion 28, intermediate portion 30, and to second portion 32 opposite back surface 16 of reflector 12. Such electromagnetic radiation is then used as appropriate according to typical uses depicted in FIGS. 3A, 3B, and 3C. As the sun travels across the sky, reflector 12 is rotated through support 24 as is known in the art. A this point, optical guide 26 bends at bend portion 34 to permit relatively rigid portion of optical guide 26, consisting of first portion 28 and intermediate portion 30 of optical guide 26, to remain at focal place 20 during such tracking maneuver. Thus, rays of the sun are efficiently gathered throughout the day for use.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A collection device for capturing and transmitting electromagnetic radiation, comprising:
    a. a reflector having concave reflecting surface, and an opposite surface, said concave reflecting surface receiving electromagnetic radiation from a source and reflecting the electromagnetic radiation to a focal place; and
    b. a flexible optical guide having a first end portion, a second end portion, and an intermediate portion between said first end portion and said second end portion, said first end portion positioned at said focal place of the reflected electromagnetic radiation to permit the reflected electromagnetic radiation to flow within said flexible optical guide to said second end portion located at said opposite surface of reflector, said first end portion further including a loop and an end surface, said end surface facing said reflecting surface of said reflector, said end surface comprising a concave surface, said intermediate portion of said flexible optical guide extending from said opposite surface of said reflector, through said reflector and outwardly from said reflecting surface of said reflector.

2. The device of claim 1 in which said reflector is movable relative to said fiber optic cable.

3. The device of claim 1 which additionally comprises a transducer linked to said second end portion of said fiber optic cable, said transducer having an input of electromagnetic radiation from said second end portion of said fiber optic cable.

4. The device of claim 1 in which said flexible optical guide comprises a fiber optic cable.

5. The device of claim 1 in which said flexible optical guide comprises a hollow wave-guide.

6. A collection device for capturing and transmitting electromagnetic radiation, comprising:
    a. a reflector having concave reflecting surface, and an opposite surface, said concave reflecting surface receiving electromagnetic radiation from a source and reflecting the electromagnetic radiation to a focal place; and b. a flexible optical guide having a first end portion, a second end portion, and an intermediate portion between said first end portion and said second end portion, said first end portion positioned at said focal place of the reflected electromagnetic radiation to permit the reflected electromagnetic radiation to flow within said flexible optical guide to said second end portion located at said opposite surface of said reflector, said intermediate portion of said flexible optical guide extending from said opposite surface of said reflector to said focal place outwardly from said reflecting surface of said reflector, said first portion of said flexible optical guide including a concave end surface facing said reflecting surface of said reflector.

7. The device of claim 6 in which said first end portion comprises a loop.

8. The device of claim 7 in which said reflector is movable relative to said fiber optic cable.

9. The device of claim 8 which additionally comprises a transducer linked to said second end portion of said fiber optic cable, said transducer having an input of electromagnetic radiation from said second end portion of said fiber optic cable.

10. The device of claim 6 in which said flexible optical guide comprises a fiber optic cable.

11. The device of claim 6 in which said flexible optical guide comprises a hollow wave-guide.

* * * * *